United States Patent

[11] 3,585,886

| [72] | Inventors | David I. McDonald<br>Cincinnati, Ohio;<br>George W. Sederberg, Highland Heights, Ky. |
|---|---|---|
| [21] | Appl. No. | 768,063 |
| [22] | Filed | Oct. 16, 1968 |
| [45] | Patented | June 22, 1971 |
| [73] | Assignee | Cincinnati Milacron Inc.<br>Cincinnati, Ohio |

[54] METHOD AND DEVICE FOR SENSING WHEN A RECIPROCATING CUTTING BLADE BREAKS
18 Claims, 5 Drawing Figs.

[52] U.S. Cl. .................................................. 83/13, 83/62, 83/925 CC
[51] Int. Cl. .................................................. B26d 1/10
[50] Field of Search .......................................... 83/62, 13, 925 CC; 234/33, 34; 77/5.2

[56] References Cited
UNITED STATES PATENTS

| 2,709,492 | 5/1955 | Thomann et al. | 83/62 X |
| 3,159,337 | 12/1964 | MacNeil et al. | 234/33 |
| 3,245,615 | 4/1966 | Heymann | 234/33 |
| 3,248,047 | 4/1966 | Basile | 234/33 |
| 3,133,457 | 5/1964 | Martens | 77/5 |
| 3,310,796 | 3/1967 | Sanders | 77/5 X |
| 3,339,434 | 9/1967 | Sparling | 77/5 |

FOREIGN PATENTS

| 977,010 | 12/1964 | Great Britain | 234/33 |
| 1,073,496 | 6/1967 | Great Britain | 234/33 |

OTHER REFERENCES

Loeber, " Read-Punch Station," IBM TECHNICAL DISCLOSURE BULLETIN Vol. 4 No. 4, page 11, Sept. 1961, copy in Group 325, 234— 33.

Primary Examiner—James M. Meister
Attorney—Frank C. Leach, Jr.

ABSTRACT: Sensing means is disposed adjacent to the end of a reciprocating cutting blade remote from its reciprocating means. Whenever the end of the reciprocating blade ceases to reciprocate because it is broken, the sensing means provides a signal to indicate this. The sensing means is rendered ineffective whenever the reciprocating cutting blade is lifted from cutting engagement with the material so that its end is no longer disposed adjacent the sensing means.

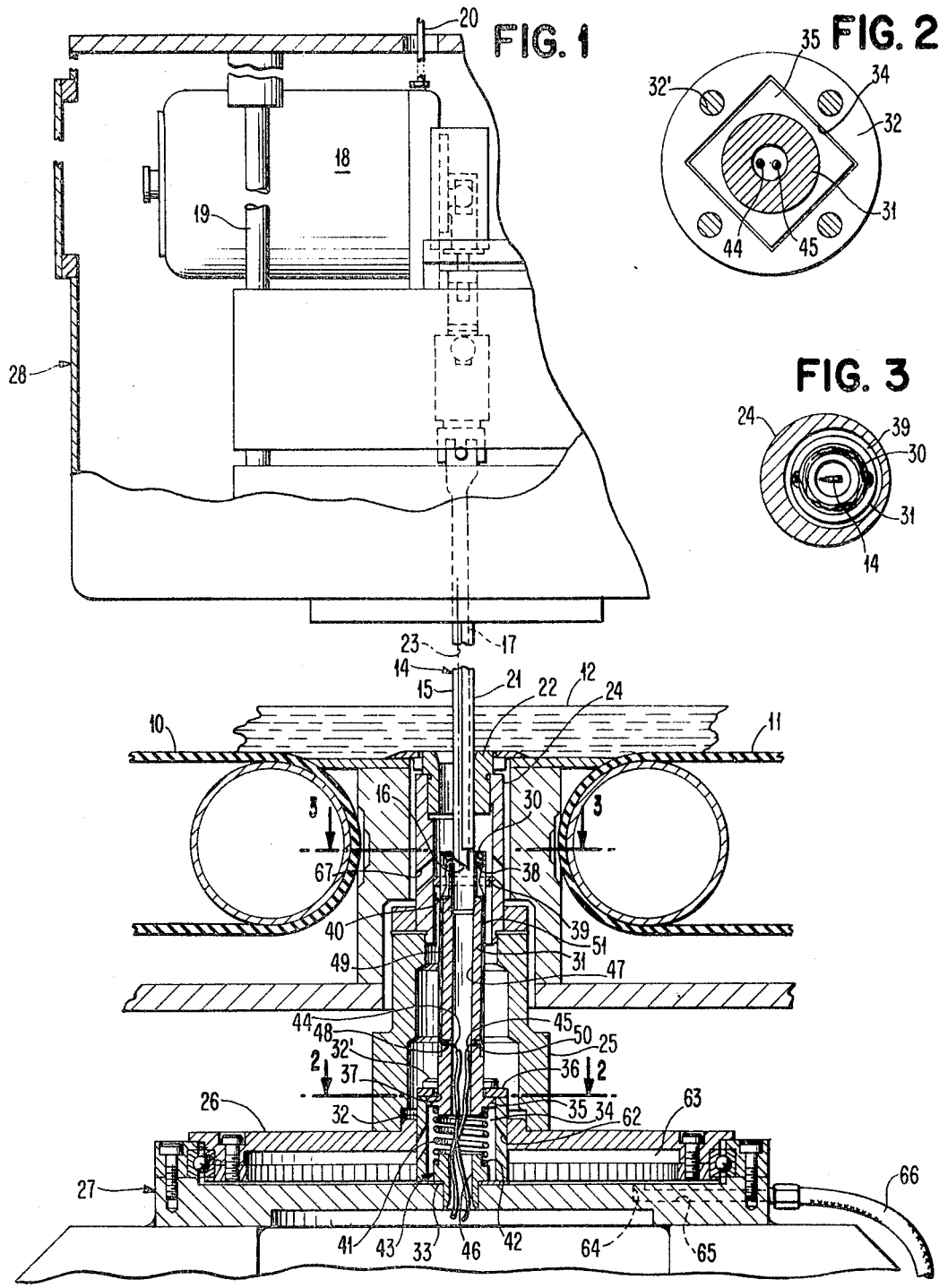

METHOD AND DEVICE FOR SENSING WHEN A RECIPROCATING CUTTING BLADE BREAKS

In the copending patent application of George W. Sederberg for "Material Cutting Machine Having Reciprocating Cutting Blade Adapted To Enter Material Without An Entrance Cut," Ser. No. 726,657, filed May 6, 1968, and assigned to the same assignee as the assignee of the present application, there is shown a material cutting machine having a reciprocating cutting blade for cutting material. During cutting of the material, the cutting blade pierces the material so that its end is hidden from the operator's view.

Since the cutting blade is not removed from the material unless the cutting blade is to be disposed at another position or heading for piercing the material, the operator of the machine cannot observe that the cutting blade is broken. As a result, the material being cut could be damaged before the operator would know that the cutting blade is broken since this would become apparent only when the cutting blade is lifted from cutting engagement with the material for piercing the material at another position.

The present invention satisfactorily solves the foregoing problem by providing a device for sensing or detecting when the cutting blade is broken. Whenever the sensing device of the present invention senses that the reciprocating cutting blade is broken, operation of the material cutting machine of the aforesaid Sederberg application is automatically stopped. By automatically stopping the material cutting machine of the aforesaid Sederberg application upon the sensing or detecting device determining that the reciprocating cutting blade is broken, no damage occurs to the material being cut or to the machine elements.

In the present invention, the sensing means is disposed adjacent one end of the reciprocating cutting blade and senses whenever the one end of the cutting blade ceases to reciprocate. Since this is the end remote from the reciprocating means, any breaking of the cutting blade results in this remote end ceasing to reciprocate. Accordingly, the present invention determines whether the cutting blade is broken by sensing whether the cutting blade is reciprocating at its end remote from the reciprocating means.

Since the cutting blade of the material cutting machine of the aforesaid Sederberg application is removed from cutting engagement with the material being cut when the cutting blade is to pierce the material at another position or heading, it is necessary to render the sensing means ineffective whenever the cutting blade is removed from the material being cut. Otherwise, the detecting or sensing means would supply a false signal since there is no reciprocation of the cutting blade adjacent the sensing means when the cutting blade is removed from its cutting position.

An object of this invention is to provide a method and device for determining when a reciprocating cutting blade breaks.

Another object of this invention is to provide a method and device for automatically stopping a material cutting machine whenever its reciprocating cutting blade breaks.

A further object of this invention is to provide a method and device for determining when a reciprocating cutting blade ceases to reciprocate within a given area when the cutting blade is in its cutting position.

Other objects of this invention will be readily perceived from the following description, claims, and drawings.

This invention relates to a device for sensing when a reciprocating cutting blade breaks. The device comprises means disposed adjacent the reciprocating path of the cutting blade with the disposed means including means to sense when the cutting blade ceases to reciprocate due to the cutting blade breaking. The sensing means is disposed adjacent one end of the cutting blade.

This invention also relates to a device for sensing when a reciprocating cutting blade ceases to reciprocate within a given area when the cutting blade is in its cutting position. The device has means disposed adjacent the reciprocating path of the cutting blade with the disposed means including means to sense when the cutting blade ceases to reciprocate within the given area when the cutting blade is in cutting engagement with the material being cut. The sensing means defines the given area and is disposed adjacent one end of the cutting blade.

This invention further relates to a method for stopping operation of a material cutting machine having a reciprocating cutting blade for cutting material when the reciprocating cutting blade breaks. The method comprises determining whether the reciprocating cutting blade is broken and automatically stopping the operation of the material cutting machine when it is determined that the cutting blade is broken.

This invention still further relates to a method for stopping operation of a material cutting machine having a reciprocating cutting blade for cutting material when the reciprocating cutting blade ceases to reciprocate within a given area when the cutting blade is in its cutting position. The method comprises determining whether the reciprocating cutting blade is reciprocating within the given area when the cutting blade is in its cutting position and automatically stopping the operation of the material cutting machine when it is determined that the cutting blade is not reciprocating within the given area when the cutting blade is in its cutting position.

This invention yet further relates to an improvement for a material cutting machine having a reciprocating cutting blade with means to support material for cutting by the cutting blade and means disposed on one side of the material supporting means to reciprocate the cutting blade. The improvement comprises means to sense when the cutting blade ceases to reciprocate with the sensing means being disposed adjacent the end of the cutting blade remote from the reciprocating means. The improvement has means to stop operation of the cutting machine when the sensing means senses that the cutting blade is not reciprocating and the cutting blade is in cutting engagement with the material being cut.

This invention also further relates to an improvement for a material cutting machine having a reciprocating cutting blade with means to support material for cutting by the cutting blade and means disposed on one side of the material supporting means to reciprocate the cutting blade. The improvement comprises means to sense when the cutting blade ceases to reciprocate within a given area and the cutting blade is in its cutting position with the sensing means disposed adjacent the end of the cutting blade remote from the reciprocating means. The improvement has means to stop operation of the material cutting means when the sensing means senses that the cutting blade is not reciprocating within the given area and the cutting blade is in its cutting position.

The attached drawings illustrate a preferred embodiment of the invention, in which:

FIG. 1 is a sectional view of a material cutting machine utilizing the sensing device of the present invention;

FIG. 2 is a sectional view, partly in plan, taken along line 2-2 of FIG. 1;

FIG. 3 is a sectional view, partly in plan, taken along line 3-3 of FIG. 1 and showing the relationship between the coil and the cutting blade;

Figure 4:
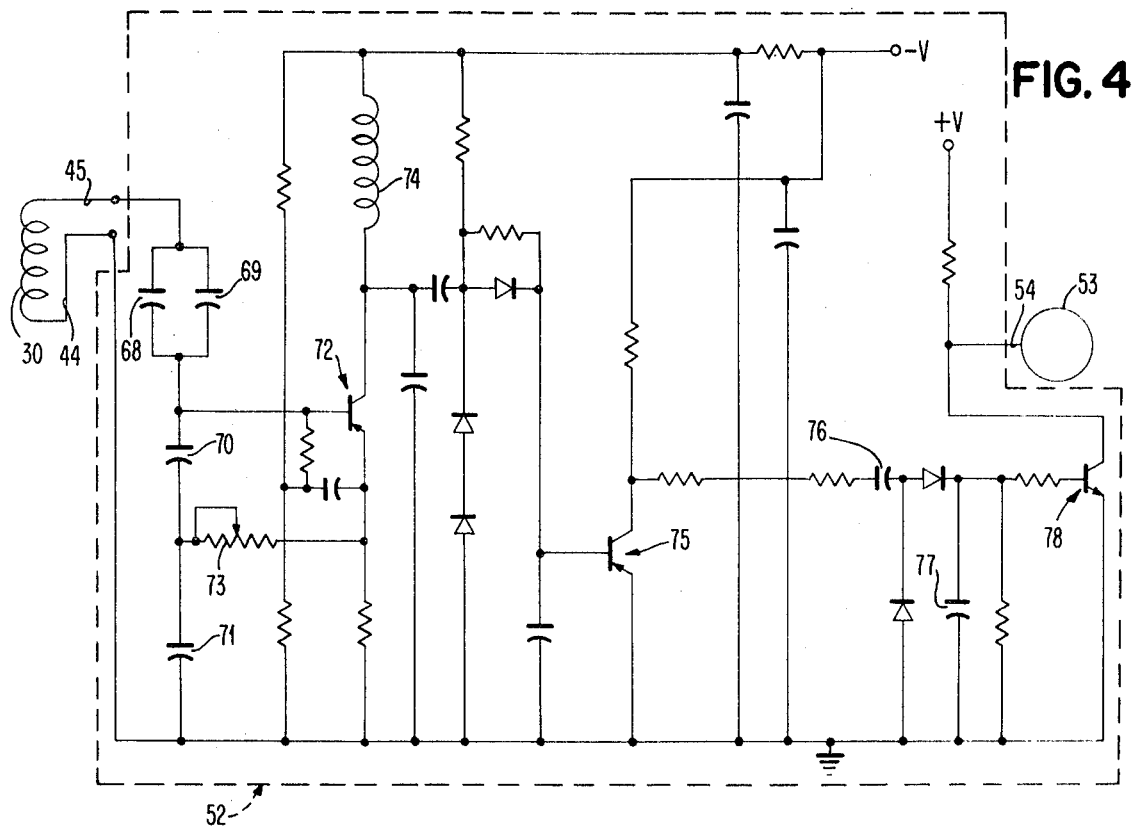
FIG. 4 is a schematic wiring diagram of the sensing circuit.

Referring to the drawings and particularly FIG. 1, there is shown a pair of endless bands or belts 10 and 11 that are part of a material cutting machine of the type more particularly shown and described in the aforesaid Sederberg application. The endless bands 10 and 11 are adapted to support material 12 thereon as more particularly shown and described in the aforesaid Sederberg application.

As described in the aforesaid Sederberg application, the endless bands 10 and 11, which are flexible and formed of any suitable material, are adapted to be driven in unison to move the material 12 thereon in a longitudinal direction. The endless bands 10 and 11 are spaced from each other to form a transverse passage or throat therebetween for reception of a cutting blade 14.

The cutting blade 14 has its leading edge 15 sharpened to a point to form a cutting surface along its entire length. The cutting blade also has an edge 16, which connects the bottom end of the leading edge 15 with the bottom end of its trailing edge 17, sharpened to a point along its entire length. Thus, the cutting blade 14 has both the leading edge 15 and the connecting edge 16 sharpened to provide cutting surfaces whereby cutting of the material 12 occurs when the connecting edge 16 is moved into engagement with the material 12.

The cutting blade 14 has its upper end attached to a motor 18, which causes reciprocation of the cutting blade 14 with respect to the material 12 supported on the endless bands 10 and 11 whereby the material 12 is cut. The upper end of the cutting blade 14 is connected to the shaft of the motor 18 through suitable means of the type more particularly shown and described in the aforesaid Sederberg application.

As more particularly shown and described in the aforesaid Sederberg application, the motor 18 is slidably supported on support rods 19. When a cable 20, which is connected to the motor 18, is actuated, the motor 18 is moved vertically to remove the cutting blade 14 from cutting engagement with the material 12 in the manner more particularly shown and described in the aforesaid Sederberg application.

The cutting blade 14 is slidably disposed within a nonreciprocating guide 21. The guide 21 is secured to a portion of the structure, which is raised when the motor 18 is lifted so that the guide 21 moves upwardly whenever the cutting blade 14 is lifted from cutting engagement with the material 12.

During cutting of the material 12, the lower end of the guide 21 is supported by a support block 22 to maintain the reciprocating cutting blade 14 perpendicular to the material 12. Since both the cutting blade 14 and the guide 21 are lifted from the support block 22 when the cutting blade 14 is raised to remove the cutting blade 14 from cutting engagement with the material 12, the cutting blade 14 and the guide 21 must slide relative to the support block 22 at this time.

It is necessary for the support block 22 to rotate whenever the cutting blade 14 rotates to permit the guide 21 to rotate with the cutting blade 14 and to allow the cutting blade 14 and the guide 21 to be properly aligned at the desired heading. The cutting blade 14 and the guide 21 are rotated about an axis 23, which is not the geometric axis of the cutting blade 14 but is closer to the leading edge 15 of the cutting blade 14, in the manner more particularly shown and described in the aforesaid Sederberg application. Accordingly, the support block 22 must be rotated the same amount as a rotary box, which is utilized in the aforesaid Sederberg application for rotating the cutting blade 14 and the guide 21 about the axis 23.

The support block 22 is carried by a hollow lower support block 24 through the lower end of the support block 22 being fixedly secured to the upper end of the lower support block 24. The lower end of the lower support block 24 is fixedly secured to the upper end of a hollow support member 25. Thus, the hollow support member 25 carries the support block 22.

The lower end of the hollow support member 25 is fixedly secured to an annular member 26, which is rotatably mounted on a lower saddle 27. The annular member 26 is adapted to be rotated about its geometric axis, which is aligned with the axis 23, when the cutting blade 14 is rotated about the axis 23 through suitable means as more particularly shown and described in the aforesaid Sederberg application.

The lower saddle 27 is adapted to slide along lower guide rails or ways in coordination with sliding movement of an upper support housing 28 for the cutting blade 14 and the guide 21. Accordingly, the lower saddle 27 is moved transversely relative to the endless bands 10 and 11 simultaneously with movement of the upper support housing 28 for the cutting blade 14 and the guide 21 in the manner more particularly shown and described in the aforesaid Sederberg application.

When the cutting blade 14 is in its lowermost position as shown in FIG. 1, its lower end is disposed within an electrical coil 30, which is supported by the upper end of a rod 31, so as to be surrounded thereby. The nonreciprocating guide 21 does not extend into the coil 30 even when the blade 14 is in its lowermost position. Accordingly, as the blade 14 reciprocates, it moves into and out of the coil 30 to produce a signal indicating this while a different signal is produced whenever the cutting blade 14 ceases to move into and out of the coil 30 during reciprocation of the cutting blade 14.

The lower end of the rod 31 is disposed within a base 32, which is fixed by screws 32' to the lower saddle 27 through a spacer 33. Thus, the base 32 cannot rotate.

The base 32 has a square-shaped chamber 34 formed therein to receive a square-shaped flange 35 on the lower end of the rod 31. The size of the flange 35 is slightly smaller than the chamber 34 so that there may be slight relative movement therebetween.

A retainer 36, which is fixedly secured to the upper end of the base 32 by the screws 32' that secure the base 32 to the lower saddle 27, retains the rod 31 within the chamber 34 in the base 32. The rod 31 is cylindrical-shaped above the flange 35 and passes through a circular opening 37 in the retainer 36. The diameter of the opening 37 is larger than the diameter of the rod 31 so that the upper end of the rod 31 may orbit relative to the retainer 36.

The coil 30 has its center aligned with the geometric axis of the cutting blade 14. Thus, the upper end of the rod 31, which has the coil 30 supported therein on a shoulder 38 thereof, is centered with respect to the geometrical axis of the cutting blade 14. However, the center of the opening 37 in the retainer 36 is aligned with the axis 23 about which the cutting blade 14 rotates. Thus, since the axis 23 is closer to the leading edge 15 of the cutting blade 14 than the geometric axis of the cutting blade 14, the longitudinal axis of the rod 31 is at an angle to the axis 23 and the vertical.

The upper end of the rod 31 has a flange 39 thereon engaging a cylindrical shaped inner surface 40 of the lower support block 24. Thus, as the lower support block 24 rotates with the cutting blade 14 about the axis 23, the upper end of the rod 31 orbits about the axis 23 of the cutting blade 14 since the geometric axis of the cutting blade 14 rotates about the axis 23 when the cutting blade 14 is rotated about the axis 23. This arrangement insures that the center of the coil 30 remains aligned with the geometric axis of the cutting blade 14.

The flange 35 on the rod 31 is urged upwardly into engagement with the retainer 36 by a spring 41, which has one end acting on the flange 35 and its other end bearing against a shoulder 42 of a plug 43. The plug 43 is supported within an opening in the lower saddle 27 and has a shoulder resting on the spacer 33.

Wires 44 and 45, which are connected to the coil 30, extend upwardly through a passage 46 in the plug 43 and then through a longitudinal passage 47 in the rod 31. The wire 44 passes from the passage 47 through a radial passage 48 in the rod 31 to the exterior thereof and extends upwardly within a longitudinal slot 49 in the outer surface of the rod 31 for connection to the coil 30. The wire 45 extends through a radial passage 50 in the rod 31 to the exterior thereof and then extends upwardly through a longitudinal slot 51 in the outer surface of the rod 31 for connection to the coil 30.

With the foregoing arrangement, the rod 31 cannot rotate but it can orbit. Thus, it is not necessary to provide any structure for allowing the wires 44 and 45 to rotate since the rod 31 does not rotate but merely orbits. However, this arrangement insures that the coil 30 is maintained with its center aligned with the geometric axis of the cutting blade 14.

The wires 44 and 45 are connected to a control circuit 52 (see FIG. 4), which has a relay 53 connected to its output lead 54. When the cutting blade 14 does not have its lower end, which is within the coil 30, reciprocating, the signal on the output lead 54 of the control circuit 52 increases to cause picking of the relay 53.

Figure 5:
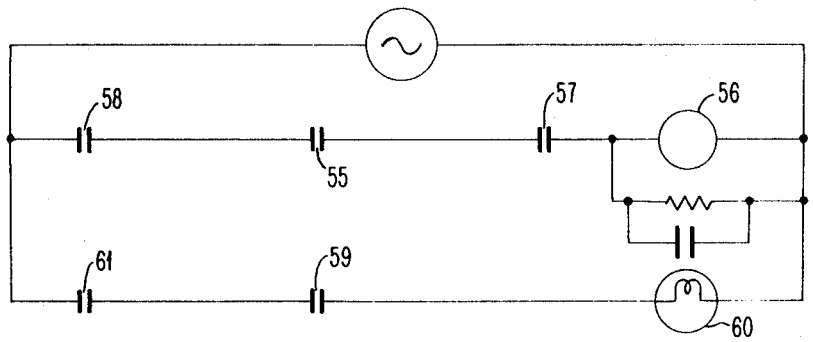
FIG. 5 is a schematic wiring diagram of the circuit for stopping operation of the material cutting machine when the cutting blade is broken.

The picking of the relay 53 closes its normally open contacts 55 (see FIG. 5) in the circuit of a control relay 56. If the cutting blade 14 is in its lowermost position, a relay (not shown) will have been picked due to a limit switch (not shown) being closed. As a result of the picking of this relay due to the cutting blade 14 being in its lowermost position, normally open contacts 57 of the relay are closed.

The contacts 57 are disposed in series with the control relay 56 and the normally open contacts 55 of the relay 53. Thus, in order to energize the relay 56, it is necessary for the cutting blade 14 to be in its lowermost position whereby the normally open contacts 57 are closed and the lower end of the cutting blade 14 to not be reciprocating so that the contacts 55 of the relay 53 are closed. When both of these conditions exist along with normally closed contacts 58 of a power relay, which is energized whenever power is supplied to the cutting machine, being closed, the relay 56 is picked. Thus, this occurs only when the cutting blade 14 is in cutting engagement with the material being cut and the cutting blade 14 ceases to reciprocate so that this indicates that the blade 14 is broken.

When the relay 56 is picked, its normally open contacts (not shown) in a numerical control apparatus (not shown), which controls the operation of the material cutting machine in the manner more particularly shown and described in the aforesaid Sederberg application, are closed. The closing of these contacts of the relay 56 inhibits any signals from the numerical control apparatus for rotating the cutting blade 14, moving the bands 11 and 12, and moving the cutting blade 14 transversely whereby operation of the material cutting machine is automatically stopped.

Additionally, the picking of the relay 56 closes normally open contacts 59 in a circuit having indicating means 60 therein to indicate to the operator that the cutting blade 14 has broken. While the indicating means 60 is shown as a light, it should be understood that any type of audio signal also could be utilized. The circuit of the indicating means 60 also includes normally open contacts 61 of the power relay (not shown), which also includes the normally open contacts 58 and is picked whenever power is supplied to the material cutting machine.

Accordingly, whenever the reciprocating cutting blade 14 ceases to reciprocate within the coil 30 and the cutting blade 14 has not been lifted from cutting engagement with the material 12, the control relay 56 is picked. As a result, this not only causes stopping of the cutting operation of the material cutting machine but also actuates the indicating means 60 to warn the operator that the cutting blade 14 has broken.

Since particles of the material 12 may fall downwardly into the space between the coil 30 and the cutting blade 14, it is desired to be able to remove these particles of the material 12 from this space. Thus, a suitable airflow arrangement is provided to direct air into the longitudinal passage 47 in the rod 31 to remove any particles of the material 12 from the interior of the coil 30.

The airflow arrangement includes passages 62 (see FIG. 1) in the base 32 providing communication from the chamber 34, which communicates with the passage 47, to a chamber 63, which is formed within the lower saddle 27 beneath the annular member 26.

The chamber 63 communicates through passages 64 and 65 in the lower saddle 27 with a flexible hose 66, which is exterior of the lower saddle 27. The flexible hose 66 is connected to a suitable source of air under pressure.

Accordingly, the supply of pressurized air through the hose 66 to the longitudinal passage 47 in the rod 31 results in the particles of the material 12, which is being cut, being removed from the interior of the rod 31. These particles exit through passages 67 in the lower support block 24.

If the pressurized air should not remove the particles from the longitudinal passage 47 in the rod 31 so that the passage 47 becomes packed with particles of the material being cut whereby the area within the coil 30 becomes filled, the cutting blade 14 engages the packed particles within the coil 30 to move the rod 31 downwardly against the force of the spring 41. When this occurs, the coil 30 is moved so that the cutting blade 14 does not enter the coil 30 during reciprocation whereby the cutting blade 14 does not reciprocate within the area of the coil 30. Thus, this stops operation of the material cutting machine even though the cutting blade 14 is not broken. As a result, the operator inspects the area within the coil 30 after it is determined that the cutting blade 14 is not broken. Of course, the operator would inspect this area even if the cutting blade 14 is broken.

As shown in FIG. 4, the control circuit 52 includes a pair of capacitors 68 and 69 in parallel with each other and connected to the coil 30 through the wire 45. The capacitors 68 and 69 and the coil 30 cooperate to form an LC resonant tank circuit, which has a resonant frequency of approximately 115 KiloHertz.

The capacitors 68 and 69 are connected to ground through capacitors 70 and 71 and to the base of PNP transistor 72. The capacitor 70 must have good temperature stability so that its capacitance does not change with temperature.

The emitter of the transistor 72 is connected through a potentiometer 73 and the capacitor 70 to the resonant tank circuit to provide feedback for the oscillating tank circuit. Thus, the potentiometer 73 is adjusted to supply sufficient feedback so that the oscillation of the tank circuit is sustained.

The transistor 72 amplifies the signal from the tank circuit. An inductance 74, which is connected to the collector of the transistor 72, increases the amplification gain of the transistor 72.

The output of the amplifying transistor 72 is connected to the base of a PNP transistor 75. When the base of the transistor 75 goes negative, the transistor 75 is turned on.

When the cutting blade 14 enters within the coil 30, it absorbs some of the energy from the coil 30 so that the oscillations of the tank circuit, which comprises the coil 30 and the capacitors 68 and 69, cease. However, since the cutting blade 14 is reciprocating within the coil 30, the blade 14 moves out of the coil 30 for a period of time so that the oscillations of the tank circuit again occur. The starting and stopping of the oscillations result in the transistor 75 turning off and on to produce a square wave output at its collector. The square wave output of the transistor 75 is supplied through a capacitor 76 to charge a capacitor 77 sufficiently so that it maintains an NPN transistor 78 in a conductive state as long as the cutting blade 14 is reciprocating within the coil 30.

When the transistor 78 becomes conductive, the signal on the output lead 54 of the control circuit 52 decreases whereby the relay 53 is deenergized. Thus, the normally open contacts 55 of the relay 53 remain open whenever the cutting blade 14 is reciprocating within the coil 30.

When the cutting blade 14 is out of the coil 30, the transistor 75 turns off due to the oscillations from the tank circuit producing a positive potential on the base of the transistor 75 to turn off the transistor 75. The capacitor 76 blocks the constant DC output from the collector of the transistor 75 so that the transistor 78 is turned off whereby the relay 53 is picked to close the normally open contacts 55.

If the cutting blade 14 is broken so that it ceases to reciprocate but is disposed within the coil 30, there are no oscillations from the oscillating circuit due to the cutting blade 14 absorbing energy from the coil 30. Thus, a negative pulse is supplied to the base of the transistor 75 to turn it on. However, because of the blocking capacitor 76, the constant DC output from the transistor 75 is not supplied to the base of the transistor 78 so that the transistor 78 is still turned off.

Accordingly, the transistor 78 can be turned on only when there is a square wave output from the transistor 75. This can occur only when the cutting blade 14 is reciprocating within the coil 30. Accordingly, the control circuit 52 produces an output on the lead 54 to pick the relay 53 whenever the cutting blade 14 is not reciprocating within the coil 30.

Considering the operation of the present invention, the control circuit 52 prevents the relay 53 from being energized as long as the cutting blade 14 is reciprocating within the coil 30. However, any time that the cutting blade 14 ceases to reciprocate within the coil 30, the control circuit 52 produces an output to pick the relay 53 whereby the normally open contacts 55 close. Since the normally open contacts 58 of the power relay are closed whenever power is being supplied to the material cutting machine, the contacts 58 are closed whenever the contacts 55 close. However, before the relay 56 can be picked, it it necessary for the normally open contacts 57 to close. The contacts 57 can close only when the cutting blade 14 is in its lowermost position.

Thus, even though the control circuit 52 picks the relay 53 whenever the cutting blade 14 is lifted from cutting engagement with the material 12 since there is no reciprocation of the cutting blade 14 within the coil 30 at this time, there is no picking of the relay 56 because the normally open contacts 57 are open since the relay, which controls the contacts 57, is deenergized as soon as the cutting blade 14 is lifted through the cable 20 being actuated by suitable means in the manner more particularly shown and described in the aforesaid Sederberg application. Accordingly, the relay 56 can only be energized when the cutting blade 14 is broken since the contacts 57 prevent energization of the relay 56 when the coil 30 ceases to sense reciprocation of the cutting blade 14 due to the cutting blade 14 being removed from cutting engagement with the material 12.

When the relay 56 is picked, normally open contacts of the relay 56 close to automatically stop operation of the material cutting machine since closing of the contacts inhibits any further signals from the numerical control apparatus. Furthermore, the energization of the relay 56 results in the indicating means 60 being activated through closing of the normally open contacts 59 of the relay 56. As previously mentioned, the normally open contacts 61 of the power relay are closed whenever there is power supplied to the material cutting machine.

Thus, when the cutting blade 14 breaks, the indicating means 60 provides a warning signal, either visual or audio, to the operator of the machine to indicate that the cutting blade 14 has broken. At this time, the operator of the cutting machine must replace the broken blade.

While the present invention has shown the coil 30 as the means for sensing when the lower end of the cutting blade 14 ceases to reciprocate, it should be understood that any other suitable means for sensing the presence and/or absence of reciprocation of the lower end of the cutting blade 14 may be utilized. For example, a proximity head could be utilized.

While the coil 30 has been shown as being mounted on the rod 31, which orbits rather than rotates, it should be understood that the sensing means, whether it is the coil 30 or any other type of sensing means, could be mounted on a rotating rod. Of course, this would require suitable electrical connections to permit the signal from the sensing means to be supplied to the control circuit 52.

While the present invention has shown and described the coil 30 as always sending signals irrespective of whether the cutting blade 14 is in cutting engagement with the material 12 or not and utilizing other controls to prevent stopping of the cutting machine when the cutting blade 14 is not in cutting engagement with the material 12 and the sensing means senses the absence of reciprocation of the cutting blade 14, it should be understood that any other type of means for controlling the stopping of the cutting machine so that it only stops when the blade is actually broken may be utilized. For example, the sensing means could be inactivated whenever the cutting blade 14 was lifted from cutting engagement with the material 12. Of course, this would require the remainder of the circuitry to be changed since the relay 54 is now picked whenever there is no signal from the coil 30.

While the present invention has described the coil 30 as being centered on the geometric axis of the cutting blade 14, it should be understood that such is not a prerequisite. However, if the coil 30 is not centered on the geometric axis of the cutting blade 14, the control circuitry would have to be modified for this.

While the cutting blade 14 has been described as being rotated about an axis different than its geometric axis, it should be understood that the present invention may be utilized with a cutting blade that is rotatable about its geometric axis. In such an arrangement, it should be understood that the coil 30 would be preferably centered on the geometric and rotatable axis but such is not a prerequisite for operation of the device of the present invention.

An advantage of this invention is that the material, which is being cut, cannot be damaged due to a broken cutting blade. Another advantage of this invention is that there is no loss of a large amount of material due to any breaking of the cutting blade.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

We claim:

1. A device for sensing when a reciprocating cutting blade that extends through the material being cut during cutting of the material by the cutting blade breaks comprising:

means disposed adjacent the reciprocating path of the cutting blade on the opposite side of the material being cut from the side on which means for reciprocating the cutting blade is disposed;

and said disposed means including means to sense when the cutting blade ceases to reciprocate due to the cutting blade breaking with the cutting blade in cutting engagement with the material being cut, said sensing means being disposed adjacent the end of the cutting blade remote from the reciprocating means.

2. The device according to claim 1 in which said sensing means is centered with respect to the geometric axis of the cutting blade.

3. A device for sensing when a reciprocating cutting blade breaks comprising:

means disposed adjacent the reciprocating path of the cutting blade;

said disposed means including means to sense when the cutting blade ceases to reciprocate due to the cutting blade breaking with the cutting blade in cutting engagement with the material being cut, said sensing means being disposed adjacent one end of the cutting blade;

and means to resiliently mount said sensing means to allow said sensing means to move if the cutting blade engages said sensing means.

4. A device for sensing when a reciprocating cutting blade breaks comprising:

means disposed adjacent the reciprocating path of the cutting blade;

said disposed means including means to sense when the cutting blade ceases to reciprocate due to the cutting blade breaking with the cutting blade in cutting engagement with the material being cut, said sensing means being disposed adjacent one end of the cutting blade;

and said sensing means including an electrical coil surrounding the one end of the cutting blade.

5. The device according to claim 4 in which the center of said coil is aligned with the geometric axis of the cutting blade.

6. A device for sensing when a reciprocating cutting blade ceases to reciprocate within a given area when the cutting blade is in its cutting position comprising:

means disposed adjacent the reciprocating path of the cutting blade;

said disposed means including means to sense when the cutting blade ceases to reciprocate within the given area when the cutting blade is in its cutting position, said sensing means defining the given area and being disposed adjacent one end of the cutting blade;

and means to resiliently mount said sensing means to allow said sensing means to be moved when certain conditions exist whereby the given area moves.

7. A method for operating a material cutting machine having a continuously reciprocating cutting blade for cutting material comprising:

continuously reciprocating the cutting blade when it is in cutting engagement with the material;

passing the cutting blade completely through the material when the cutting blade is in cutting engagement therewith; maintaining the cutting blade completely through the material when the cutting blade is in cutting engagement therewith;

determining whether the reciprocating cutting blade is broken by determining whether the end of the cutting blade remote from its reciprocating means ceases to reciprocate when the cutting blade is in cutting engagement with the material being cut;

and automatically stopping the operation of the material cutting machine when it is determined that the cutting blade is broken.

8. A method for stopping operation of a material cutting machine having a continuously reciprocating cutting blade for cutting material when the continuously reciprocating cutting blade ceases to reciprocate within a given area disposed on the opposite side of the material being cut from means for reciprocating the cutting blade when the cutting blade is in cutting engagement with the material comprising:

determining whether the reciprocating cutting blade is in cutting engagement with the material;

determining whether the reciprocating cutting blade is reciprocating within the given area when the cutting blade is in cutting engagement with the material;

and automatically stopping the operation of the material cutting machine when it is determined that the cutting blade is not reciprocating within the given area and the cutting blade is in cutting engagement with the material.

9. In a material cutting machine having a reciprocating cutting blade, means to support material for cutting by the cutting blade, means disposed on one side of the material supporting means to reciprocate the cutting blade for cutting of the material by the cutting blade extending through the material being cut, the improvement comprising:

means to sense when the cutting blade ceases to reciprocate within a given area on the opposite side of the material supporting means from the reciprocating means when the cutting blade is in cutting engagement with the material;

said sensing means being disposed adjacent the end of the cutting blade remote from the reciprocating means and on the opposite side of the material supporting means from the reciprocating means;

and means to stop operation of the material cutting machine when said sensing means senses that the cutting blade is not reciprocating within the given area and the cutting blade is in cutting engagement with the material being cut.

10. In a material cutting machine having a reciprocating cutting blade, means to support material for cutting by the cutting blade, means disposed on one side of the material supporting means to reciprocate the cutting blade, the improvement comprising:

means to sense when the cutting blade ceases to reciprocate;

said sensing means being disposed adjacent the end of the cutting blade remote from the reciprocating means;

said sensing means surrounding the end of the cutting blade that is remote from the reciprocating means;

and means to stop operation of the material cutting machine when said sensing means senses that the cutting blade is not reciprocating and the cutting blade is in cutting engagement with the material being cut.

11. In a material cutting machine having a reciprocating cutting blade, means to support material for cutting by the cutting blade, means disposed on one side of the material supporting means to reciprocate the cutting blade, the improvement comprising:

means to sense when the cutting blade ceases to reciprocate;

said sensing means being disposed adjacent the end of the cutting blade remote from the reciprocating means;

said sensing means including an electrical coil in surrounding relation to the cutting blade;

and means to stop operation of the material cutting machine when said sensing means senses that the cutting blade is not reciprocating and the cutting blade is in cutting engagement with the material being cut.

12. The improvement according to claim 11 including:

a hollow support rod supporting said coil;

and said rod receiving the end of the cutting blade therein that is remote from the reciprocating means whereby said coil surrounds the cutting blade.

13. The improvement according to claim 12 including means to resiliently mount said rod whereby said coil may move when engaged by the cutting blade.

14. The improvement according to claim 12 including means to direct a gas into the interior of said rod to prevent the accumulation of any articles of the material from clogging the area adjacent said coil.

15. The improvement according to claim 11 in which the center of said coil is aligned with the geometric axis of the blade.

16. The improvement according to claim 15 in which:

the cutting blade is rotatable about an axis that is not aligned with its geometric axis;

and means to mount said rod to orbit said coil about the axis of rotation of the cutting blade when the cutting blade is rotated to maintain the center of said coil aligned with the geometric axis of the blade.

17. The improvement according to claim 9 including:

means for indicating that the cutting blade is broken; and means to activate said indicating means only when said sensing means senses that the blade is not reciprocating and the cutting blade is in cutting engagement with the material being cut.

18. The improvement according to claim 9 including means to prevent said stopping means from being rendered effective when the cutting blade ceases to be in cutting engagement with the material being cut.

UNITED STATES PATENT OFFICE
CERTIFICATE OF CORRECTION

Patent No.   3,585,886                    Dated   June 22, 1971

Inventor(s)   David I. McDonald et al.

It is certified that error appears in the above-identified patent and that said Letters Patent are hereby corrected as shown below:

Column 4, line 10, "nonreciprocating" should read -- non-reciprocating --; lines 21, 22 and 29, cancel the hyphen, each occurrence. Column 5, lines 58 and 62, "airflow", each occurrence, should read -- air flow --. Column 6, line 54, "deenergized" should read -- de-energized --. Column 7, line 13, "it", second occurrence, should read -- is --; line 23, "deenergized" should read -- de-energized --; line 74, "54" should read -- 53 --. Column 9, line 16, "maintaining" should start a separate paragraph. Column 10, line 40, "articles" should read -- particles --; line 53, "and" should start a separate paragraph.

Signed and sealed this 16th day of May 1972.

(SEAL)
Attest:

EDWARD M. FLETCHER, JR.                ROBERT GOTTSCHALK
Attesting Officer                       Commissioner of Patents